United States Patent
Ko et al.

(10) Patent No.: US 8,630,373 B2
(45) Date of Patent: Jan. 14, 2014

(54) RECEIVER FOR RECEIVING SIGNAL CONTAINING CLOCK INFORMATION AND DATA INFORMATION, AND CLOCK-EMBEDDED INTERFACE METHOD

(75) Inventors: Jae-hong Ko, Seoul (KR); Paul Kim, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 535 days.

(21) Appl. No.: 12/875,359

(22) Filed: Sep. 3, 2010

(65) Prior Publication Data
US 2011/0058635 A1  Mar. 10, 2011

(30) Foreign Application Priority Data
Sep. 4, 2009  (KR) .................. 10-2009-0083510

(51) Int. Cl.
*H04L 27/00*  (2006.01)
(52) U.S. Cl.
USPC .......................................... 375/326; 375/371
(58) Field of Classification Search
USPC .................. 375/326, 327, 371, 373, 376, 221
See application file for complete search history.

(56) References Cited

U.S. PATENT DOCUMENTS

| | | | |
|---|---|---|---|
| 8,279,976 B2* | 10/2012 | Lin et al. | 375/316 |
| 2002/0106031 A1* | 8/2002 | Ebuchi et al. | 375/257 |
| 2004/0036494 A1* | 2/2004 | Mak et al. | 324/763 |
| 2006/0170451 A1* | 8/2006 | Jordanger et al. | 326/34 |
| 2006/0203939 A1* | 9/2006 | Chou et al. | 375/319 |
| 2006/0226908 A1* | 10/2006 | Abe | 330/257 |
| 2007/0090801 A1* | 4/2007 | Kim | 320/128 |
| 2007/0201541 A1* | 8/2007 | Chuang et al. | 375/221 |
| 2009/0212864 A1* | 8/2009 | Huang et al. | 330/258 |

FOREIGN PATENT DOCUMENTS

| | | |
|---|---|---|
| JP | 2009-048154 | 3/2009 |
| KR | 100822307 B1 | 4/2008 |
| KR | 1020090006411 A | 1/2009 |

* cited by examiner

*Primary Examiner* — Emmanuel Bayard
(74) *Attorney, Agent, or Firm* — Myers Bigel Sibley & Sajovec, P.A.

(57) ABSTRACT

A receiver for receiving information that contains clock information and data information and a clock-embedded interface method. In the clock-embedded method, a clock signal and data may be reconstructed by receiving a pair of differential signals that contain clock information and data information and by using a change in a common voltage of the pair of differential signals.

17 Claims, 16 Drawing Sheets

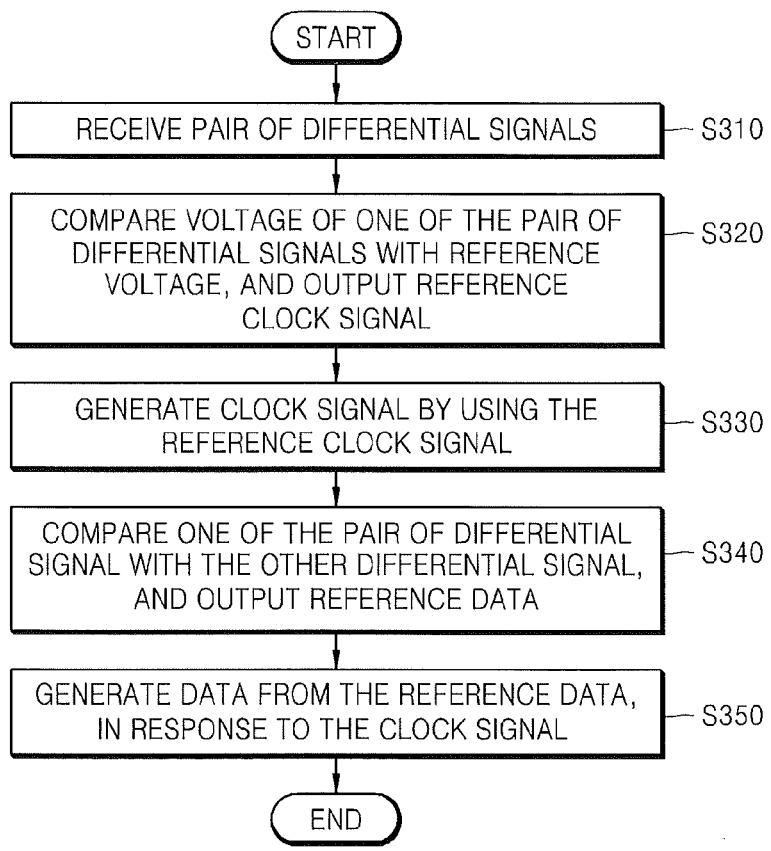
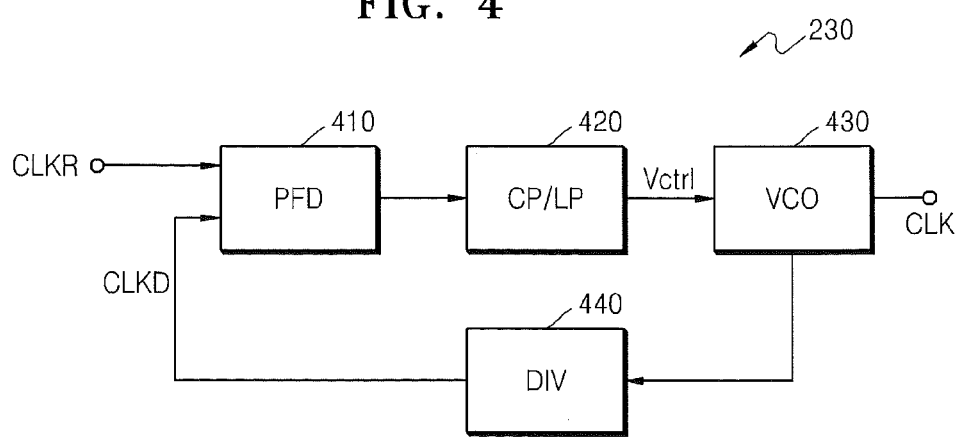

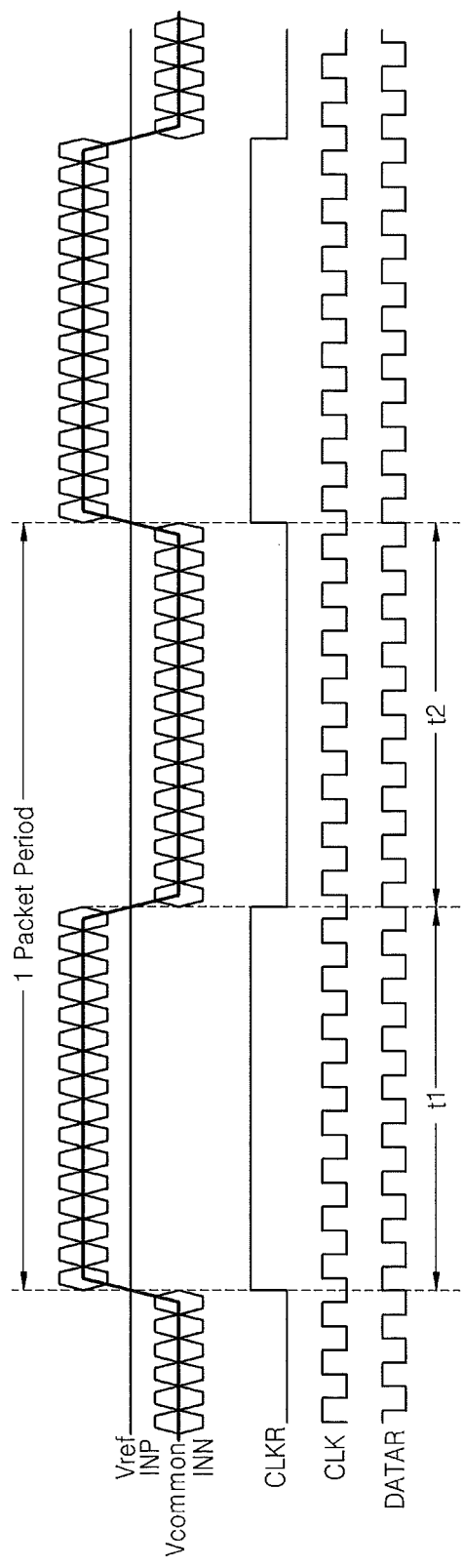

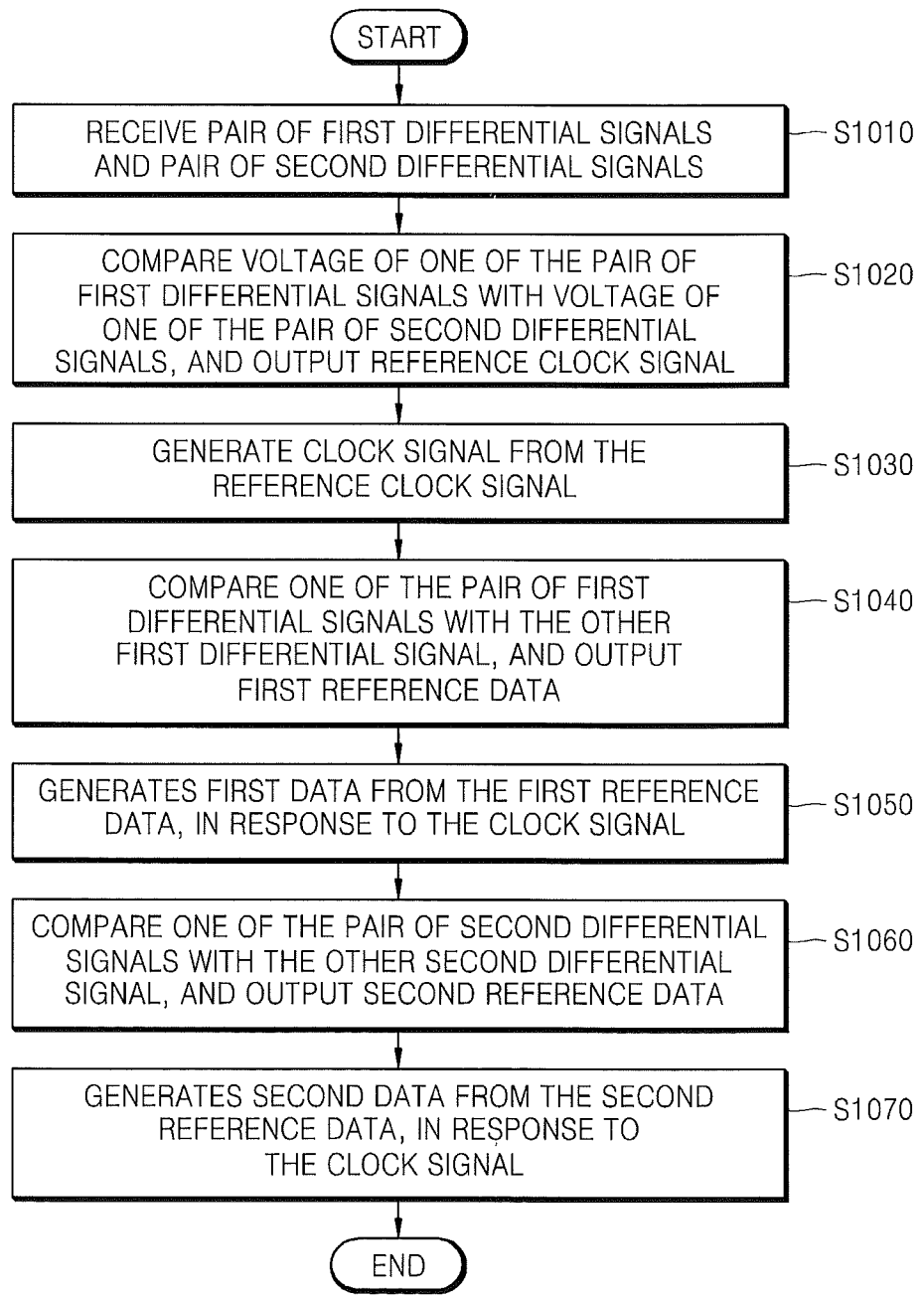

RECEIVER FOR RECEIVING SIGNAL CONTAINING CLOCK INFORMATION AND DATA INFORMATION, AND CLOCK-EMBEDDED INTERFACE METHOD

REFERENCE TO PRIORITY APPLICATION

This application claims priority to Korean Patent Application No. 10-2009-0083510, filed Sep. 4, 2009, the contents of which are hereby incorporated herein in its entirety.

FIELD OF THE INVENTION

This invention relates to receivers and, more particularly, to receivers for receiving signals that contain clock information and data information, and clock-embedded interface methods.

BACKGROUND

In order to transmit or receive data and a clock signal, the data and the clock signal may be transmitted or received individually via separate lines or a signal that contains both information regarding the data and information regarding the clock signal may be transmitted or received via one line. Conventionally, in order to transmit or receive the signal that contains both the information regarding the data and the information regarding the clock signal via one line, a first part of the signal, which indicates the information regarding the clock signal, and a second part of the signal, which indicates the information regarding the data, are transmitted having different amplitudes. For example, the first part of the signal is transmitted having a high amplitude, the second part of the signal is transmitted having a low amplitude, and then, the clock signal and the data are reconstructed.

SUMMARY

The inventive concept provides a receiver for reconstructing a clock signal and data by using a change in a common voltage of a pair of differential signals, and a system apparatus and a display device having the receiver.

The inventive concept also provides a clock-embedded interface method of reconstructing a clock signal and data by using a change in a common voltage of a pair of differential signals.

According to an aspect of the inventive concept, there is provided a receiver including a clock signal generator for generating a clock signal, based on the result of comparing a voltage of one of a pair of differential signals with a reference voltage; and a data generator generating data from the pair of differential signals, in response to the clock signal, wherein voltages of the pair of differential signals are higher than the reference voltage in a first section and are lower than the reference voltage in a second section.

The clock signal generator may include a first comparator for comparing the voltage of one of the pair of differential signals with the reference voltage and outputting a reference clock signal; and a clock signal generator for generating the clock signal by using the reference clock signal.

According to another aspect of the inventive concept, there is provided a system apparatus including a transmitter for transmitting a pair of differential signals, the voltages of which are higher than a reference voltage in a first section and are lower than the reference voltage in a second section; and a receiver for receiving the pair of differential signals, and generating a clock signal and data by using the pair of differential signals.

According to another aspect of the inventive concept, there is provided a display device including a panel having a plurality of pixel regions; a source driver for driving a plurality of source lines of the panel; and a controller for transmitting a pair of differential signals to the source driver, where voltages of the pair of differential signals are higher than a reference voltage in a first section and are lower than the reference voltage in a second section, wherein the source driver receives the pair of differential signals, and generates a clock signal and data by using the pair of differential signals.

According to another aspect of the inventive concept, there is provided a receiver including a clock signal generator for generating a clock signal, based on the result of comparing one of a pair of first differential signals with one of a pair of second differential signals; a first data generator for generating first data from the pair of first differential signals, in response to the clock signal; and a second data generator for generating second data from the pair of second differential signals, in response to the clock signal, wherein voltages of the pair of first differential signals are higher than voltages of the pair of second differential signals in a first section and are lower than the voltages of the pair of second differential signals in a second section.

According to another aspect of the inventive concept, there is provided a system apparatus including a transmitter for transmitting a pair of first differential signals and a pair of second differential signals; and a receiver for receiving the pairs of first and second differential signals, and generating a clock signal, first data, and second data by using the pairs of first and second differential signals, wherein voltages of the pair of first differential signals are higher than voltages of the pair of second differential signals in a first section and are lower than the voltages of the pair of second differential signals in a second section.

According to another aspect of the inventive concept, there is provided a display device including a panel having a plurality of pixel regions; a source driver for driving a plurality of source lines of the panel; and a controller for transmitting a pair of first differential signals and a pair of second differential signals to the source driver, wherein the source driver receives the pairs of first and second differential signals, and generates a clock signal, first data, and second data by using the pairs of first and second differential signals, and voltages of the pair of first differential signals are higher than voltages of the pair of second differential signals in a first section and are lower than the voltages of the pair of second differential signals in a second section.

The source driver may include a clock signal generator for generating the clock signal, based on the result of comparing one of the pair of first differential signals with one of the pair of second differential signals; a first data generator for generating the first data from the pair of first differential signals, in response to the clock signal; and a second data generator for generating the second data from the pair of second differential signals, in response to the clock signal.

According to another aspect of the inventive concept, there is provided a clock-embedded interface method including transmitting a pair of differential signals, the voltages of which are higher than a reference voltage in a first section and are lower than the reference voltage in a second section; receiving the pair of differential signals; and generating a clock signal and data by using the pair of differential signals.

According to another aspect of the inventive concept, there is provided a clock-embedded interface method including receiving a pair of first differential signals and a pair of second differential signals; and generating a clock signal, first data, and second data by using the pairs of first and second differential signals, wherein voltages of the pair of first differential signals are higher than voltages of the pair of second differential signals in a first section and are lower than the voltages of the pair of second differential signals in a second section.

BRIEF DESCRIPTION OF THE DRAWINGS

FIG. 3 is a flowchart illustrating a clock-embedded interface method according to an embodiment of the inventive concept;

FIG. 4 is a block diagram of a clock signal generator included in the receiver of FIG. 2, according to an embodiment of the inventive concept;

FIG. 5A is a waveform diagram of signals related to the receiver of FIG. 2 when the clock signal generator of the receiver is embodied as illustrated in FIG. 4, according to an embodiment of the inventive concept;

FIG. 10 is a flowchart illustrating a clock-embedded interface method according to another embodiment of the inventive concept;

DETAILED DESCRIPTION OF THE EMBODIMENTS

Figure 1:
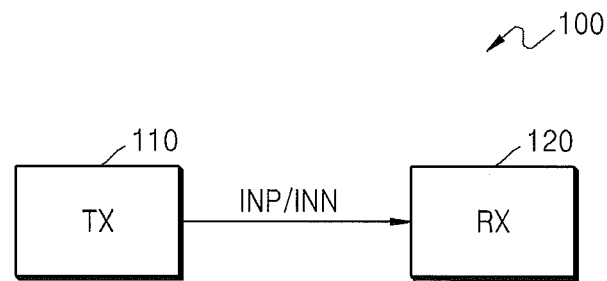
FIG. 1 is a block diagram of a system apparatus according to an embodiment of the inventive concept.

FIG. 1 is a block diagram of a system apparatus 100 according to an embodiment of the inventive concept. Referring to FIG. 1, the system apparatus 100 may include a transmitter 110 and a receiver 120. The transmitter 110 may transmit a pair of differential signals INP and INN, the voltages of which are higher than a reference voltage in a first section and are lower than the reference voltage in a second section. The pair of differential signals INP and INN contain clock information and data information. The length of the first section may be equal to that of the second section. For example, the length of each of the first and second sections may be 1/n times than that of a data packet, where n is an even number. The receiver 120 may receive the pair of differential signals INP and INN and generate the clock signal and the data by using the pair of differential signals INP and INN. The structure of the receiver 120 and a method of generating the clock signal and the data from the pair of differential signals INP and INN in the receiver 120 will now be described in detail.

Figure 2:
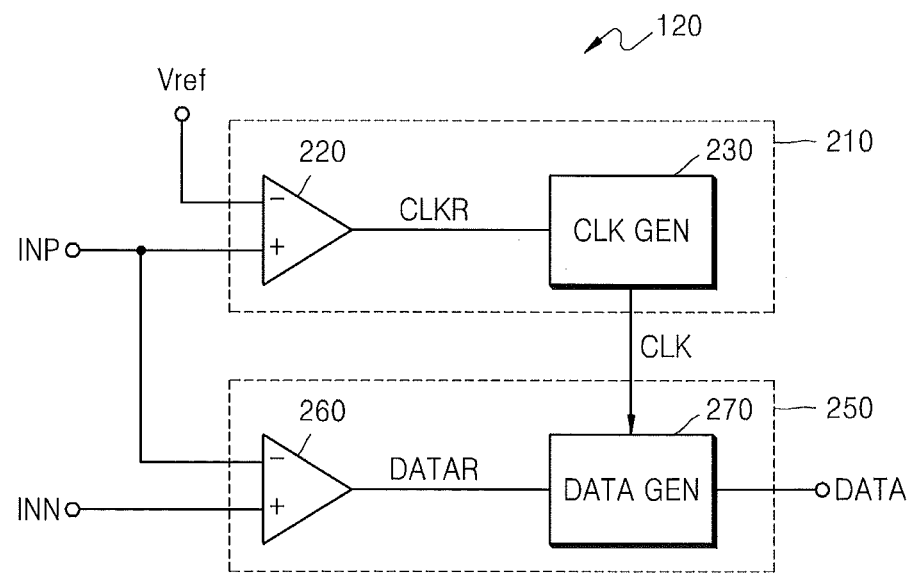
FIG. 2 is a block diagram of a receiver according to an embodiment of the inventive concept.

FIG. 2 is a block diagram of a receiver 120 according to an embodiment of the inventive concept. Referring to FIG. 2, the receiver 120 may include a clock signal generator 210 and a data generation unit 250. The clock signal generator 210 may generate a clock signal CLK by comparing a voltage of a differential signal INP with a reference voltage Vref from among a pair of differential signals INP and INN supplied to the receiver 120, and then output the clock signal CLK. The clock signal generator 210 may include a first comparator 220 and a clock signal generator 230. The first comparator 220 may generate a reference clock signal CLKR by comparing the voltage of the differential signal INP with the reference voltage Vref. The clock signal generator 230 may receive the reference clock signal CLKR and generate the clock signal CLK by using the reference clock signal CLKR. The clock signal generator 230 may be a phase locked loop (PLL) or a delay locked loop (DLL). A case where the clock signal generator 230 is a PLL will be described in detail with reference to FIGS. 4 to 5B later. A case where the clock signal generator 230 is a DLL will be described in detail with reference to FIGS. 6 to 7B later.

The data generation unit 250 may receive the clock signal CLK from the clock signal generator 210, and generate data DATA from the pair of differential signals INP and INN in response to the clock signal CLK. The data generation unit 250 may include a second comparator 260 and a data generator 270. The second comparator 260 may compare the pair of differential signals INP and INN with each other and then may output reference data DATAR. The data generator 270 may receive the clock signal CLK from the clock signal generator 210, and may generate the data DATA from the reference data DATAR and output the data DATA, in response to the clock signal CLK. For example, if the reference data DATAR generated by comparing the pair of differential signals INP and INN with each other is serial data, then the data generator 270 may transform the reference data DATAR that is serial data into the data DATA that is parallel data and then output the data DATA, in response to the clock signal CLK.

The receiver 120 of FIG. 2 may be the same as the receiver 120 of the system apparatus 100 illustrated in FIG. 1.

FIG. 3 is a flowchart illustrating a clock-embedded interface method according to an embodiment of the inventive concept. Referring to FIGS. 1 and 3, the receiver 120 receives a pair of differential signals INP and INN transmitted from the transmitter 110 (operation S310). The first comparator 220 compares a voltage of the differential signal INP with a reference voltage Vref from among the pair of differential signals INP and INN, and then outputs a reference clock signal CLKR (operation S320). The clock signal generator 230 generates a clock signal CLK by using the reference clock signal CLKR (operation S330). The second comparator 260 compares the differential signal INP with the differential signal INN and outputs reference data DATAR (operation S340). The data generator 270 generates data DATA from the reference data DATAR, in response to the clock signal CLK (operation S350).

FIG. 4 is a block diagram of the clock signal generator 230 included in the receiver 120 of FIG. 2, according to an embodiment of the inventive concept. That is, FIG. 4 illustrates a case where the clock signal generator 230 is a PLL. The clock signal generator 230 may include a phase frequency detector (PFD) 410, a charge pump/loop filter (CP/LP) 420, a voltage-controlled oscillator (VCO) 430, and a divider (DIV) 440.

The PFD 410 compares a reference clock signal CLKR with a divided clock signal CLKD and detects and outputs the phase difference between the reference clock signal CLKR and the divided clock signal CLKD. The CP/LP 420 transforms an output signal of the PFD 410 into a voltage signal and outputs it as a voltage control signal Vctrl for controlling the VCO 430. The VCO 430 outputs a clock signal CLK having a predetermined frequency, in response to the voltage control signal Vctrl. The divider 440 divides the clock signal CLK received from the VCO 430 and outputs a divided clock signal CLKD. However, if the clock signal generator 230 is a PLL, a clock signal generator according to the inventive concept is not limited to the clock signal generator 230 illustrated in FIG. 4 and may further include elements other than illustrated in FIG. 4 provided it can generate a clock signal CLK illustrated in FIG. 5A or 5B.

Figure 5B:
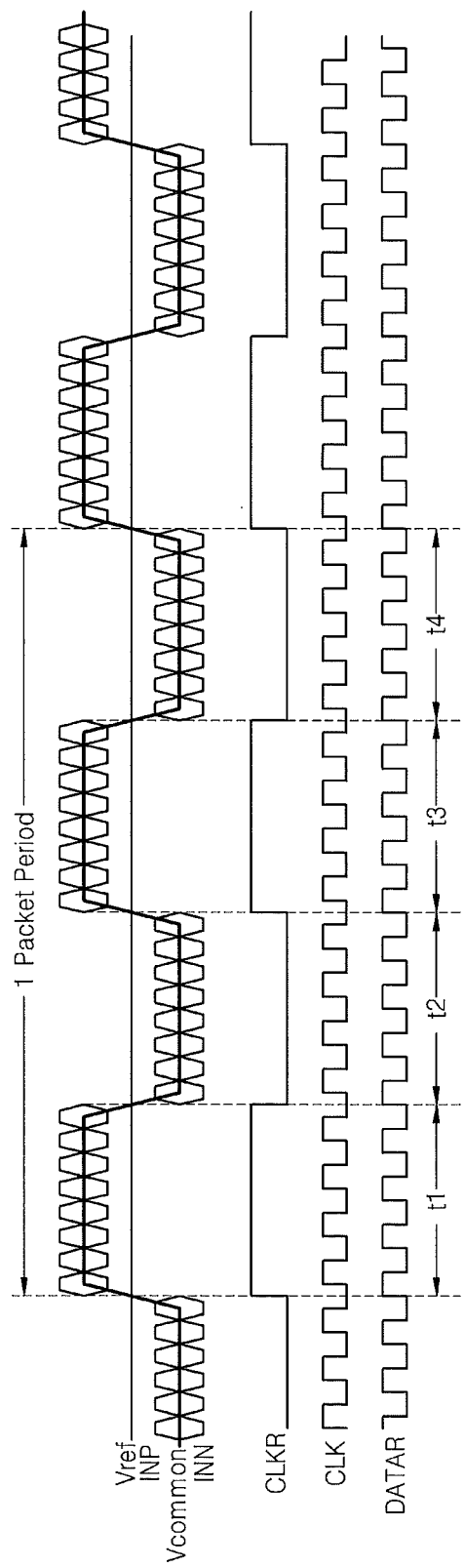
FIG. 5B is a waveform diagram of signals related to the receiver of FIG. 2 when the clock signal generator of the receiver is embodied as illustrated in FIG. 4, according to another embodiment of the inventive concept.

FIG. 5A is a waveform diagram of signals related to the receiver 120 of FIG. 2 when the clock signal generator 230 of the receiver 120 is embodied as illustrated in FIG. 4, according to an embodiment of the inventive concept. Referring to FIGS. 1 to 5A, the receiver 120 receives a pair of differential signals INP and INN as illustrated in FIG. 5A from the transmitter 110. The pair of differential signals INP and INN have a voltage that is higher than a reference voltage Vref in a first section t1 and that is lower than the reference voltage Vref in a second section t2. A common voltage Vcommon of the pair of differential signals INP and INN is higher than the reference voltage Vref in the first section t1 and is lower than the reference voltage Vref in the second section t2. However, the inventive concept is not limited thereto and the common voltage Vcommon of the pair of differential signals INP and INN may be lower than the reference voltage Vref in the first section t1 and be higher than the reference voltage Vref in the second section t2. FIG. 5A illustrates that the length of the first section t1 is equal to that of the second section t2 but the length of the first section t1 may be different from that of the second section t2. Also, FIG. 5A illustrates that one data packet is divided into the first and second sections t1 and t2 but the data packet may be divided into n sections, where n is an even number. FIG. 5B illustrates a case where one data packet is divided into first to fourth sections t1, t2, t3, and t4.

The differential signal INN is supplied to a first (+) input terminal of the first comparator 220 from among the pair of differential signals INN and INP and INN, and a reference voltage Vref is applied to a second (−) input terminal of the first comparator 220. In the first section t1, a voltage of the differential signal INN is higher than the reference voltage Vref and a reference clock signal CLKR is thus logic high. In the second section t2, the voltage of the differential signal INN is lower than the reference voltage Vref and the reference clock signal CLKR is thus logic low. The clock signal generator 230 that is a PLL as illustrated in FIG. 4 receives the reference clock signal CLKR, and outputs a clock signal CLK by transforming the frequency of the reference clock signal CLKR. Referring to FIG. 5A, since the data packet is 32 bits long, the clock signal generator 230 transforms the frequency of the reference clock signal CLKR so that a rising edge and a falling edge may occur thirty-two times and then outputs the clock signal CLK. The frequency of the clock signal CLK may be controlled by adjusting a division rate of the divider 440 of FIG. 4 if needed.

The differential signal INN is supplied to a first (+) input terminal of the second comparator 260 and the differential signal INP is supplied to a second (−) input terminal of the input terminal of the second comparator 260. In this case, a reference data DATAR output from the second comparator 260 may be serial data, and the data generator 270 may transform reference data DATAR that is serial data into data DATA that is parallel data and output the reference data DATAR. The data generator 270 may generate the data DATA at rising and falling edges of the clock signal CLK.

FIG. 5B is a waveform diagram of signals related to the receiver 120 of FIG. 2 when the clock signal generator 230 of the receiver 120 is embodied as illustrated in FIG. 4, according to another embodiment of the inventive concept. FIG. 5A illustrates a case where one data packet is divided into a first section t1 and a second section t2. FIG. 5B illustrates a case where one data packet is divided into first to fourth sections t1, t2, t3, and t4.

Referring to FIGS. 1 to 5B, the receiver 120 receives a pair of differential signals INP and INN as illustrated in FIG. 5B from the transmitter 110. The pair of differential signals INP and INN have a voltage that is higher than a reference voltage Vref in the first section t1 and the third section t3 and that is lower than the reference voltage Vref in the second section t2 and the fourth section t4. A common voltage Vcommon of the pair of differential signals INP and INN is higher than the reference voltage Vref in the first section t1 and the third section t3 and is lower than the reference voltage Vref in the second section t2 and the fourth section t4. However, the inventive concept is not limited thereto.

The differential signal INN is supplied to the first (+) input terminal of the first comparator 220 and the reference voltage Vref is supplied to the second (−) input terminal of the first comparator 220. In the first and third sections t1 and t3, the voltage of the differential signal INN is higher than the reference voltage Vref, a reference clock signal CLKR is thus logic high. In the second and fourth section t2 and t4, the differential signal INN is lower than the reference voltage Vref, the reference clock signal CLKR is thus logic low. The clock signal generator 230 that is a PLL as illustrated in FIG. 4 receives the reference clock signal CLKR and outputs a clock signal CLK by transforming the frequency of the reference clock signal CLKR. Referring to FIG. 5B, since the data packet is 32 bits long as in FIG. 5A, the clock signal generator 230 transforms the frequency of the reference clock signal CLKR so that a rising edge and a falling edge may occur thirty-two times and then outputs the clock signal CLK. The frequency of the clock signal CLK may be controlled by adjusting a division rate of the divider 440 of FIG. 4 if needed.

The operation of the data generation unit 250 is as described above with reference to FIG. 5A.

Figure 6:
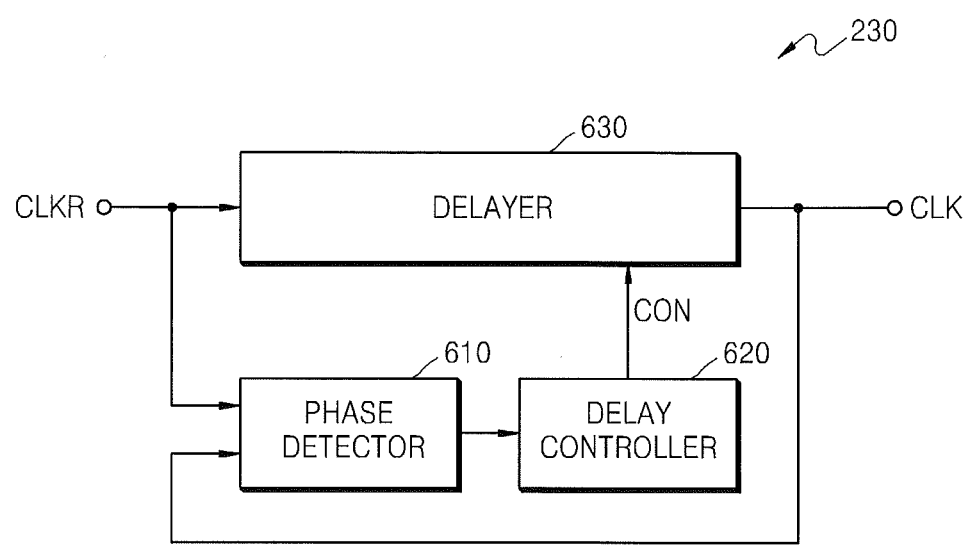
FIG. 6 is a block diagram of another embodiment of the clock signal generator included in the receiver of FIG. 2, according to the inventive concept.

FIG. 6 is a block diagram of another embodiment of the clock signal generator 230 included in the receiver of FIG. 2, according to the inventive concept. That is, FIG. 6 illustrates a case where the clock signal generator 230 is a DLL. Referring to FIG. 6, the clock signal generator 230 may include a phase detector 610, a delay controller 620, and a delayer 630. The phase detector 610 compares a reference clock signal CLKR with a clock signal CLK, and detects and outputs the difference between phases of the reference clock signal CLKR and the clock signal CLK. The delay controller 620 outputs a control signal CON for controlling delayer 630, in response to an output signal of the phase detector 610. The delayer 630 delays the reference clock signal CLKR for a predetermined time and outputs the clock signal CLK, in response to the control signal CON. The delayer 630 may include a plurality of delay terminals (not shown), and each of the delay terminals may include an inverter or a flip flop. However, if the clock signal generator 230 is a DLL, a clock signal generator according to the inventive concept is not limited to the clock signal generator 230 illustrated in FIG. 6 and may further include elements other than illustrated in FIG. 6 provided it can generate a plurality of clock signals CLK0, CLK1, . . . , and CLK15 of FIG. 7.

Figure 7A:
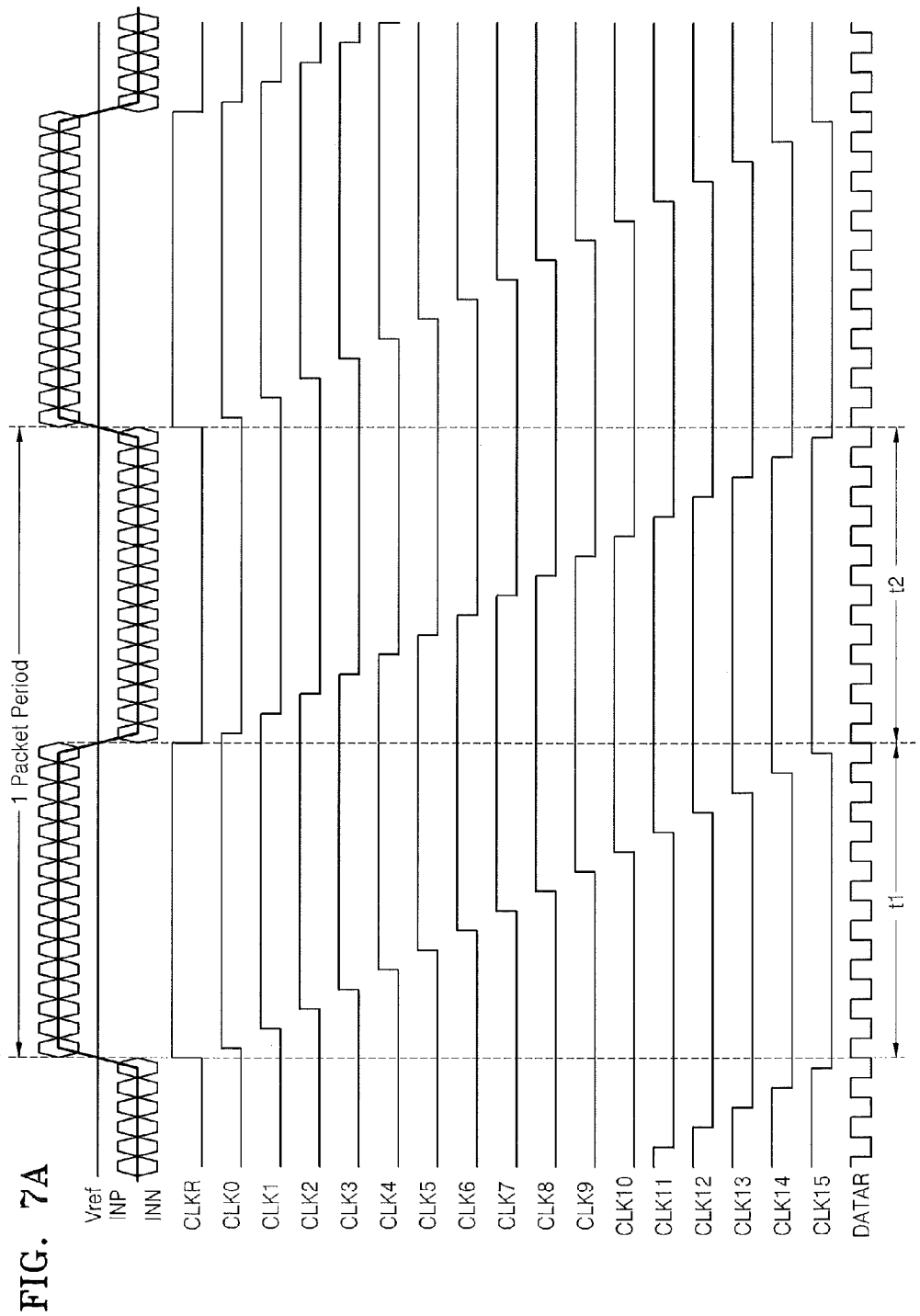
FIG. 7A is a waveform diagram of signals related to the receiver of FIG. 2 when the clock signal generator of the receiver is embodied as illustrated in FIG. 6, according to an embodiment of the inventive concept.
Figure 7B:
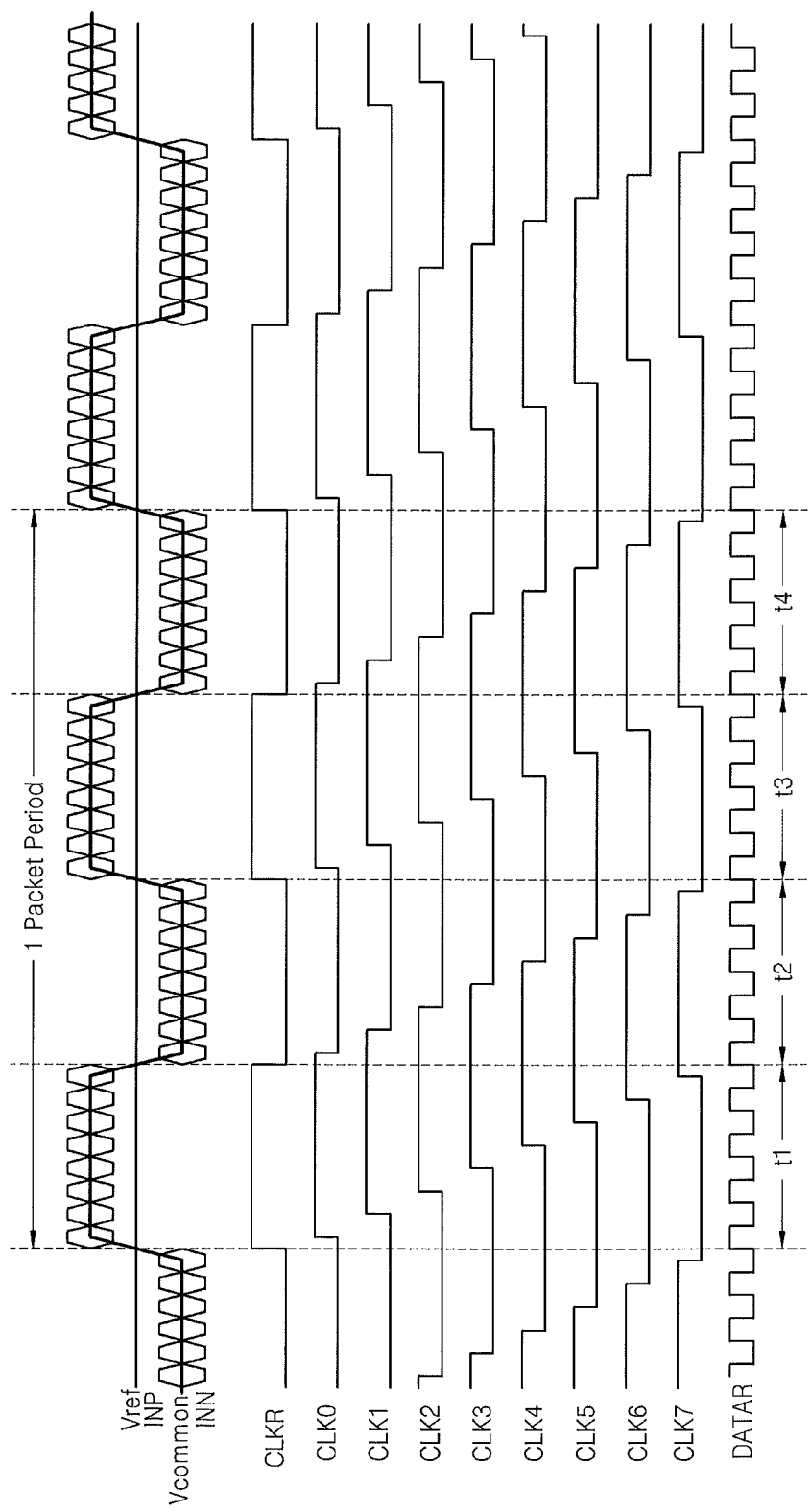
FIG. 7B is a waveform diagram of signals related to the receiver of FIG. 2 when the clock signal generator of the receiver is embodied as illustrated in FIG. 6, according to another embodiment of the inventive concept.

FIG. 7A is a waveform diagram of signals related to the receiver 120 of FIG. 2 when the clock signal generator 230 of the receiver 120 is embodied as illustrated in FIG. 6, according to an embodiment of the inventive concept. Referring to FIGS. 1 to 3, 6, and 7A, the receiver 120 receives a pair of differential signals INP and INN illustrated in FIG. 7A from the transmitter 110. The pair of differential signals INP and INN have a voltage that is higher than a reference voltage Vref in a first section t1 and that is lower than the reference voltage Vref in a second section t2. A common voltage Vcommon of the pair of differential signals INP and INN is higher than the reference voltage Vref in the first section t1 and is lower than the reference voltage Vref in the second section t2. However, the inventive concept is not limited thereto, and the pair of differential signals INP and INN may be lower than the reference voltage Vref in the first section t1 and be higher than the reference voltage Vref in the second section t2. FIG. 7A illustrates that the length of the first section t1 is equal to that of the second section t2 but the length of the first section t1 may be different from that of the second section t2. Also, FIG. 7A illustrates that one data packet is divided into the first section t1 and the second section t2 but the data packet may be divided into n sections, where n is an even number. FIG. 7B illustrates a case where one data packet is divided into first to fourth sections t1, t2, t3, and t4.

The differential signal INN is supplied to the first (+) input terminal of the first comparator 220 and the reference voltage Vref is applied to the second (−) input terminal of the first comparator 220. In the first section t1, the voltage of the differential signal INN is higher than the reference voltage Vref and a reference clock signal CLKR is logic high. In the second section t2, the differential signal INN is lower than the reference voltage Vref and the reference clock signal CLKR is thus logic low. The clock signal generator 230 of FIG. 6 that is a DLL receives the reference clock signal CLKR, delays it for a predetermined time, and then outputs a clock signal CLK. Referring to FIG. 7A, since one data packet is 32 bits long and the length of the first section t1 is equal to that of the second section t2, the clock signal generator 230 generates and outputs sixteen clock signals CLK0, CLK1, . . . , and CLK15. That is, the clock signal generator 230 outputs the clock signal CLK0 by delaying the reference clock signal CLKR for the predetermined time, and outputs the clock signal CLK1 by delaying the clock signal CLK0 for the predetermined time. The clock signal generator 230 outputs sequentially the sixteen clock signals CLK0, CLK1, . . . , and CLK15 that are obtained in this way. However, if the number of bits in the data packet changes, the clock signal generator 230 may generate clock signals, the total number of which is different from sixteen by adjusting the predetermined time.

The differential signal INN is supplied to the first (+) input terminal of the second comparator 260 and the other differential signal INP is supplied to the second (−) input terminal of the second comparator 260. In this case, reference data DATAR output from the second comparator 260 may be serial data, and the data generator 270 may transform the reference data DATAR that is serial data into data DATA that is parallel data and output the data DATA, in response to the clock signal CLK. The data generator 270 may generate the data DATA at rising and falling edges of the clock signals CLK0, CLK1, . . . , and CLK15. That is, the data generator 270 may generate the data DATA at the rising edges of the clock signals CLK0, CLK1, . . . , and CLK15 in the first section t1, and may generate the data DATA at the falling edges of the clock signals CLK0, CLK1, . . . , and CLK15 in the second section t2.

FIG. 7B is a waveform diagram of signals related to the receiver 120 of FIG. 2 when the clock signal generator 230 of the receiver 120 is embodied as illustrated in FIG. 6, according to another embodiment of the inventive concept. FIG. 7A illustrates a case where one data packet is divided into a first section t1 and a second section t2, whereas FIG. 7B illustrates a case where one data packet is divided into first to fourth sections t1, t2, t3, and t4.

Referring to FIGS. 1 to 3, 6, and 7B, the receiver 120 receives a pair of differential signals INP and INN illustrated in FIG. 7B from the transmitter 110. The pair of differential signals INP and INN have a voltage that is higher than a reference voltage Vref in the first section t1 and the third section t3 and that is lower than the reference voltage Vref in the second section t2 and the fourth section t4. A common voltage Vcommon of the pair of differential signals INP and INN is higher than the reference voltage Vref in the first section t1 and the third section t3 and is lower than the reference voltage Vref in the second section t2 and the fourth section t4. However, the inventive concept is not limited thereto.

The differential signal INN is supplied to the first (+) input terminal of the first comparator 220 and the reference voltage Vref is applied to the second (−) input terminal of the first comparator 220. In the first and second sections t1 and t3, the differential signal INN is higher than the reference voltage Vref and a reference clock signal CLKR is logic high. In the second and fourth sections t2 and t4, the differential signal INN is lower than the reference voltage Vref and the reference clock signal CLKR is thus logic low. The clock signal generator 230 of FIG. 6 that is a DLL receives the reference clock signal CLKR, delays it for a predetermined time, and outputs a clock signal CLK. Referring to FIG. 7B, the data packet is 32-bits long and the lengths of the first to fourth sections t1, t2, t3, and t4 are the same, and thus, the clock signal generator 230 generates eight clock signals CLK0, CLK1, . . . , and CLK7. That is, the clock signal generator 230 outputs the clock signal CLK0 by delaying the reference clock signal CLKR for the predetermined time, and outputs the clock signal CLK1 by delaying the clock signal CLK0 for the predetermined time. The clock signal generator 230 outputs' sequentially the clock signals CLK0, CLK1, . . . , and CLK7 that are obtained in this way. Referring to FIG. 7B, since the data packet is divided into four sections, i.e., the first to fourth sections t1 to t4, data may be generated using the clock signals CLK0, CLK1, ..., and CLK7, the total number of which is half that of the clock signals CLK0, CLK1, ..., and CLK15 illustrated in FIG. 7A. That is, when the receiver 120 receives the pair of differential signals INP and INN illustrated in FIG. 7B, the total number of the delay terminals of delayer 630 may be reduced to half compared to when the receiver 120 receives the pair of differential signals INP and INN illustrated in FIG. 7A.

The operation of the data generation unit 250 is as described above with reference to FIG. 7A.

Figure 8:
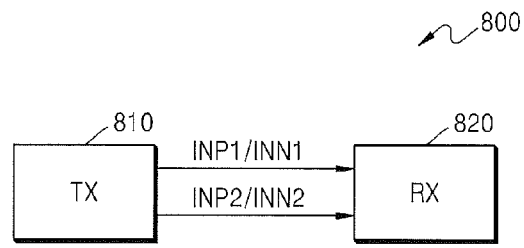
FIG. 8 is a block diagram of a system apparatus according to another embodiment of the inventive concept.

FIG. 8 is a block diagram of a system apparatus 800 according to another embodiment of the inventive concept. Referring to FIG. 8, the system apparatus 800 may include a transmitter 810 and a receiver 820. The transmitter 810 may transmit a pair of first differential signals INP1 and INN1 having a voltage that is higher than a reference voltage in a first section and that is lower than the reference voltage in a second section. The transmitter 810 may further transmit a pair of second differential signals INP2 and INN2 having a voltage that is higher than the reference voltage in the first section and that is lower than the reference voltage in the second section. Each of the pair of first differential signals INP1 and INN1 and the pair of second differential signals INP2 and INN2 may contain clock information and data information. The length of the first section may be equal to that of the second section. For example, the length of each of the first and second sections may be 1/n times than that of a data packet, where n is an even number.

The receiver 820 may receive the pair of first differential signals INP1 and INN1 and the pair of second differential signals INP2 and INN2, and generate a clock signal, first data, and second data by using the pair of first differential signals INP1 and INN1 and the pair of second differential signals INP2 and INN2. The structure of the receiver 820, and a method of generating the clock signal, the first data, and the second data from the pair of first differential signals INP1 and INN1 and the pair of second differential signals INP2 and INN2 in the receiver 820, will now be described in detail.

Figure 9:
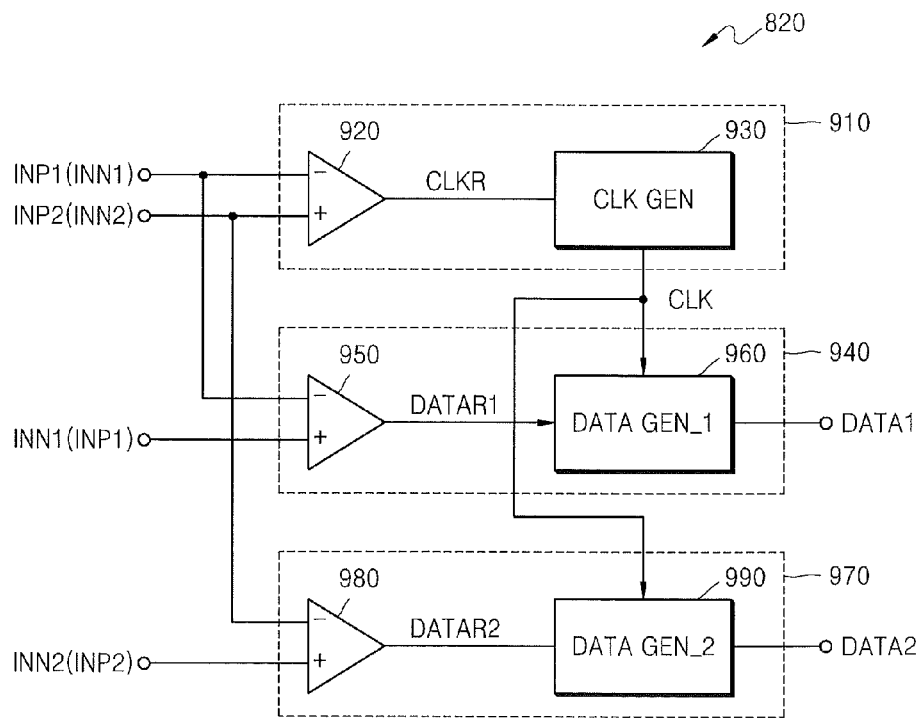
FIG. 9 is a block diagram of a receiver according to another embodiment of the inventive concept.

FIG. 9 is a block diagram of a receiver 820 according to another embodiment of the inventive concept. Referring to FIGS. 8 and 9, the receiver 820 may include a clock signal generator 910, a first data generator 940, and a second data generator 970. The clock signal generator 910 may compare a voltage of the first differential signal INP1 or INN1 with a voltage of the second differential signal INP2 or INN2 and generate a clock signal CLK based on the comparison result. The clock signal generator 910 may include a first comparator 920 and a clock signal generator 930. The first comparator 920 may compare a voltage of the other first differential signal INP1 or INN1 with a voltage of the other second differential signal INP2 or INN2, and generate and output a reference clock signal CLKR based on the comparison result. The clock signal generator 930 may receive the reference clock signal CLKR and generate a clock signal CLK from the reference clock signal CLKR. The clock signal generator 930 may be a PLL or a DLL. A case where the clock signal generator 930 is a PLL will be described in detail with reference to FIGS. 11A and 11B later. A case where the clock signal generator 930 is a DLL will be described in detail with reference to FIGS. 12A and 12B later.

The first data generator 940 may receive the clock signal CLK from the clock signal generator 910, and generate first data DATA1 from the pair of first differential signals INP1 and INN1, in response to the clock signal CLK. The first data generator 940 may include a second comparator 950 and a first data generator 960. The second comparator 950 may compare the first differential signal INP1 with the first differential signal INN1 and generate first reference data DATAR1. The first data generator 960 may receive the clock signal CLK from the clock signal generator 910, and generate the first data DATA1 from the first reference data DATAR1 and output the first data DATA1, in response to the clock signal CLK. For example, if the first reference data DATAR1 generated by comparing the first differential signal INP1 with the first differential signal INN1 is serial data, then the data generator 960 may transform the first reference data DATAR1 that is the serial data into the first data DATA1 that is parallel data and then output the first data DATA1, in response t the clock signal CLK.

The second data generator 970 may receive the clock signal from the clock signal generator 910, and generate second data DATA2 from the pair of second differential signals INP2 and INN2, in response to the clock signal CLK. The second data generator 970 may include a third comparator 980 and a second data generator 990. The third comparator 980 may compare the second differential signal INP2 with the second differential signal INN2 and then output second reference data DATAR2. The second data generator 990 may receive the clock signal CLK from the clock signal generator 910, and generate the second data DATA2 from the second reference data DATAR2 and output the second data DATA2, in response to the clock signal CLK. For example, if the second reference data DATAR2 generated by comparing the second differential signal INP2 with the second differential signal INN2 is serial data, the second data generator 990 may transform the second reference data DATAR that is serial data into the second data DATA2 that is parallel data and then output the second data DATA2, in response to the clock signal CLK.

The receiver 820 of the FIG. 9 may be the same as the receiver 820 of the system apparatus 800.

FIG. 10 is a flowchart illustrating a clock-embedded interface method according to another embodiment of the inventive concept. Referring to FIGS. 8 to 10, the receiver 920 receives a pair of first differential signals INP1 and INN1 and a pair of second differential signals INP2 and INN2 from the transmitter 910 (operation S1010). The first comparator 920 compares a voltage of the first differential signal INP1 or INN1 with a voltage of the second differential signal INP2 or INN2 and then outputs a reference clock signal CLKR (operation S1020). The clock signal generator 920 generates a clock signal CLK from the reference clock signal CLKR (operation S1030). The second comparator 950 compares the first differential signal INP1 with the first differential signal INN1 and outputs first reference data DATAR1 (operation S1040). The first data generator 960 generates first data DATA1 from the first reference data DATAR1, in response to the clock signal CK (operation S1050). The third comparator 980 compares the second differential signal INP2 with the second differential signal INN2 and outputs second reference data DATAR2 (operation S1060). Then, the second data generator 990 generates second data DATA2 from the second reference data DATAR2, in response to the clock signal CLK (operation S1070).

Figure 11A:
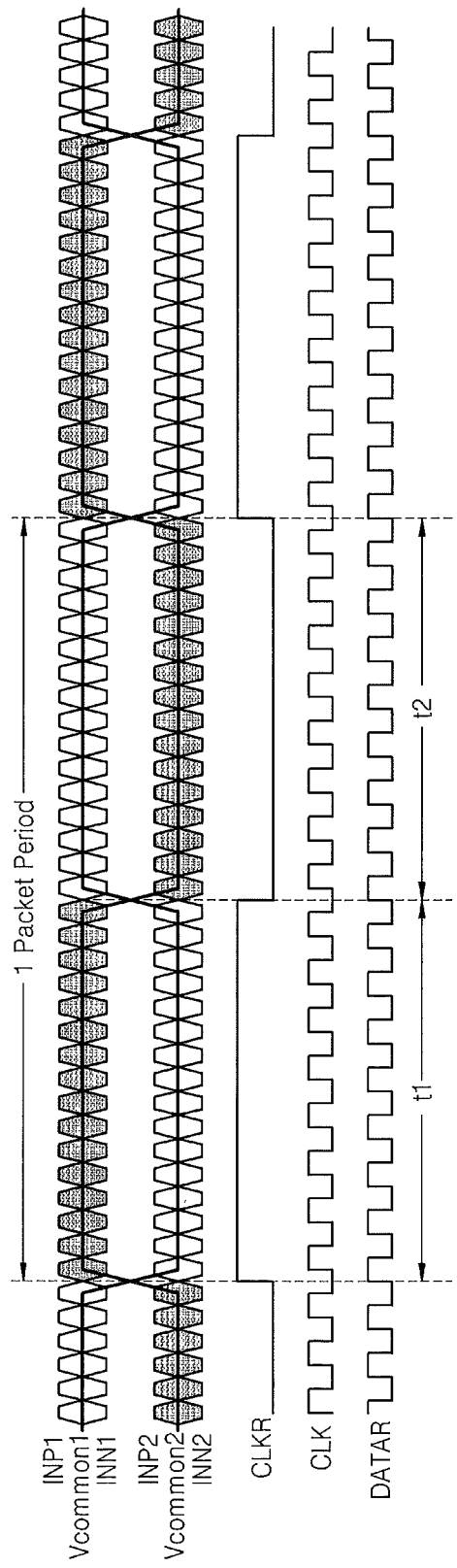
FIG. 11A is a waveform diagram of signals related to the receiver of FIG. 9 when the clock signal generator of the receiver is embodied as illustrated in FIG. 4, according to an embodiment of the inventive concept.

FIG. 11A is a waveform diagram of signals related to the receiver 820 of FIG. 9 when the clock signal generator 930 of the receiver 820 is embodied as illustrated in FIG. 4, according to an embodiment of the inventive concept. That is, FIG. 11A is a waveform diagram of signals related to the receiver 820 when the clock signal generator 930 of FIG. 9 includes a PLL as in FIG. 4, according to an embodiment of the inventive concept.

Referring to FIGS. 4 and 8 to 11A, the receiver 820 receives a pair of first differential signals INP1 and INN1 and a pair of second differential signals INP2 and INN2 as illustrated in FIG. 11A from the transmitter 810. Voltages of the pair of first differential signals INP1 and INN1 are higher than those of the pair of second differential signals INP2 and INN2 in a first section t1 and are lower than those of the pair of second differential signals INP2 and INN2 in a second section t2. A first common voltage Vcommon1 of the pair of first differential signals INP1 and INN1 is higher than a second common voltage Vcommon2 of the pair of second differential signals INP2 and INN2 in the first section t1, and is lower than the second common voltage Vcommon2 of the pair of second differential signals INP2 and INN2 in the second section t2. However, the inventive concept is not limited thereto, and the voltages of the pair of first differential signals INP1 and INN1 may be lower than those of the pair of second differential signals INP2 and INN2 in the first section t1 and may be higher than those of the pair of second differential signals INP2 and INN2 in the second section t2. Referring to FIG. 11A, the length of the first section t1 is equal to that of the second section t2 but may be different from that of the second section t2. Also, FIG. 11A illustrates that one data packet is divided into the first section t1 and the second section t2 but the data packet may be divided into n sections, where n is an even number. FIG. 11B illustrates a case where one data packet is divided into first to fourth sections t1, t2, t3, and t4.

The first differential signal INP1 or INN1 is supplied to a first (+) input terminal of the first comparator 920 and the second differential signal INP2 or INN2 is supplied to a second (−) input terminal of the first comparator 920. In the first section t1, the voltage of the first differential signal INP1 or INN1 is higher than that of the second differential signal INP2 or INN2 and a reference clock signal CLKR is thus logic high. In the second section t2, the first differential signal INP1 or INN1 is lower than the second differential signal INP2 or INN2 and the reference clock signal CLKR is thus logic low. The clock signal generator 930 of FIG. 4 that is a PLL receives the reference clock signal CLKR, generates a clock signal CLK by transforming the frequency of the reference clock signal CLKR, and then outputs the clock signal CLK. Referring to FIG. 11A, since the data packet is 32 bits long, the clock signal generator 930 transforms the frequency of the reference clock signal CLKR so that a rising edge and a falling edge may occur thirty-two times and then outputs the clock signal CLK. The frequency of the clock signal CLK may be controlled by adjusting a division rate of the divider 440 of FIG. 4 if needed.

The first differential signal INP1 or INN1 is supplied to the first (+) input terminal of the second comparator 950 and the other first differential signal INP1 or INN1 is supplied to the second (−) input terminal of the second comparator 950. In this case, first reference data DATAR1 output from the second comparator 950 is serial data, and the first data generator 960 may transform the first reference data DATAR1 that is serial data into first data DATA1 that is parallel data and then output the first data DATA1, in response to the clock signal CLK. The first data generator 960 may generate the first data DATA1 at rising and falling edges of the clock signal CLK.

The second differential signal INP2 or INN2 is supplied to the first (+) input terminal of the third comparator 980 and the other second differential signal INP2 or INN2 is supplied to the second (−) input terminal of the third comparator 980. In this case, second reference data DATAR2 output from the third comparator 980 may be serial data, and the second data generator 990 may transform the second reference data DATAR2 that is serial data into second data DATA2 that is parallel data and then output the second data DATA2, in response to the clock signal CLK. The second data generator 990 may generate the second data DATA2 at the rising and falling edges of the clock signal CLK.

Figure 11B:
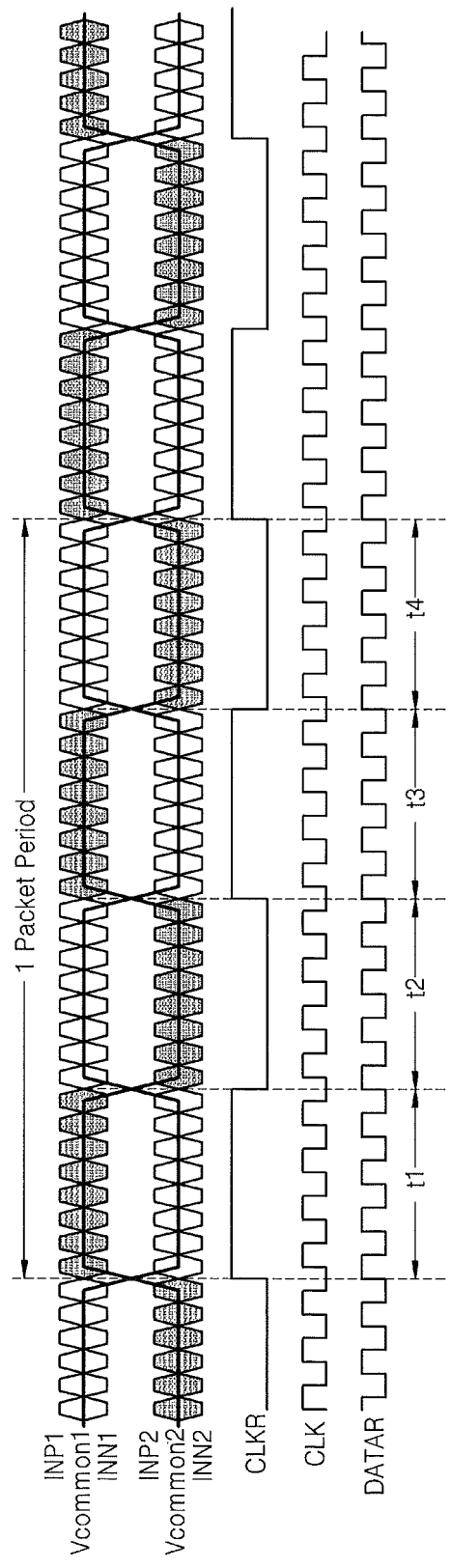
FIG. 11B is a waveform diagram of signals related to the receiver of FIG. 9 when the clock signal generator of the receiver is embodied as illustrated in FIG. 4, according to another embodiment of the inventive concept.

FIG. 11B is a waveform diagram of signals related to the receiver 820 of FIG. 9 when the clock signal generator 930 of the receiver is embodied as illustrated in FIG. 4, according to another embodiment of the inventive concept. That is, FIG. 11B is a waveform diagram of signals related to the receiver 820 when the clock signal generator 930 includes a PLL as in FIG. 4, according to another embodiment of the inventive concept.

FIG. 11A illustrates a case where one data packet is divided into a first section t1 and a second section t2, whereas FIG. 11B illustrates a case where one data packet is divided into first to fourth sections t1, t2, t3, and t4.

Referring to FIGS. 4 and 8 to 11B, the receiver 120 receives a pair of first differential signals INP1 and INN1 and a pair of second of differential signals INP2 and INN2 as illustrated in FIG. 11B from the transmitter 810. Voltage of the pair of first differential signals INP1 and INN1 are higher than those of the pair of second differential signals INP2 and INN2 in the first section t1 and the third section t3 and are lower than those of the pair of second differential signals INP2 and INN2 in the second section t2 and the fourth section t4. A first common voltage Vcommon1 of the pair of first differential signals INP1 and INN1 is higher than a second common voltage Vcommon2 of the pair of second differential signals INP2 and INN2 in the first section t1 and the third section t3 and are lower than those of the pair of second differential signals INP2 and INN2 in the second section t2 and the fourth section t4. However, the inventive concept is not limited thereto as described above with reference to FIG. 11A.

The first differential signal INP1 or INN1 is supplied to the first (+) input terminal of the first comparator 920 and the second differential signal INP2 or INN2 is supplied to the second (−) input terminal of the first comparator 920. In the first section t1 and the third section t3, the voltage of the first differential signal INP1 or INN1 is greater than that of the second differential signal INP2 or INN2 and a reference clock signal CLKR is thus logic high. In the second section t2 and the fourth section t4, the voltage of the first differential signal INP1 or INN1 is lower than that of the second differential signal INP2 or INN2 and the reference clock signal CLKR is thus logic low. The clock signal generator 930 of FIG. 4 that is a PLL receives the reference clock signal CLKR, transforms the frequency of the reference clock signal CLKR, and then outputs a clock signal CLK. Referring to FIG. 11B, since the data packet is 32 bits long as in FIG. 11A, the clock signal generator 930 transforms the reference clock signal CLKR so that a rising edge and a falling edge occur thirty-two times and then outputs a clock signal CLK. However, the frequency of the clock signal may be controlled by adjusting the division rate of the divider 440 of FIG. 4 if needed.

The operations of the first data generator 940 and the second data generator 970 are as described above with reference to FIG. 11A.

Figure 12A:
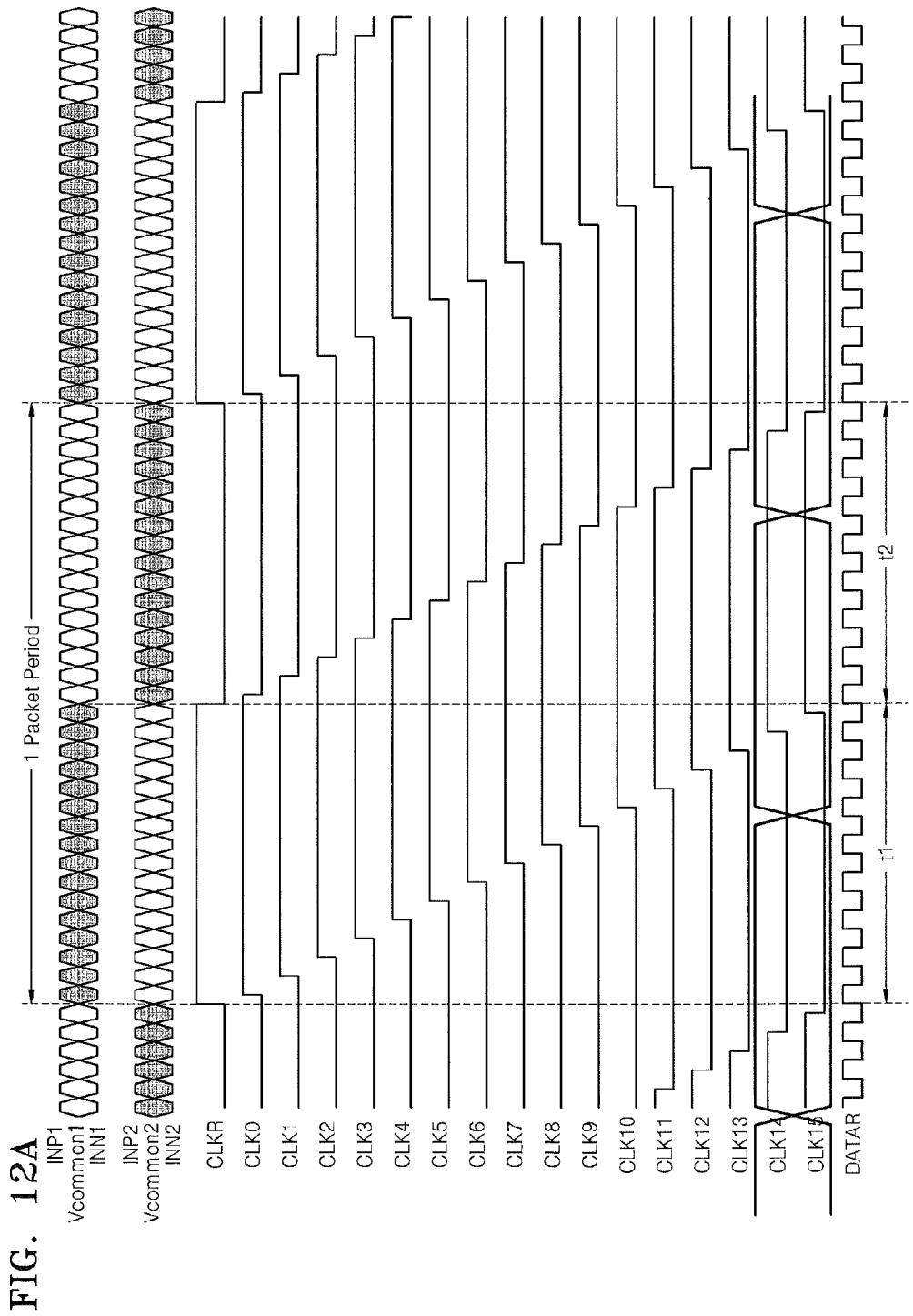
FIG. 12A is a waveform diagram of signals related to the receiver of FIG. 9 when the clock signal generator of the receiver is embodied as illustrated in FIG. 6, according to an embodiment of the inventive concept.

FIG. 12A is a waveform diagram of signals related to the receiver 820 of FIG. 9 when the clock signal generator 930 of the receiver 820 is embodied as illustrated in FIG. 6, according to an embodiment of the inventive concept. That is, FIG. 12A is a waveform diagram of signals related to the receiver 820 when the clock signal generator 230 includes a DLL as illustrated in FIG. 6, according to an embodiment of the inventive concept.

Figure 12B:
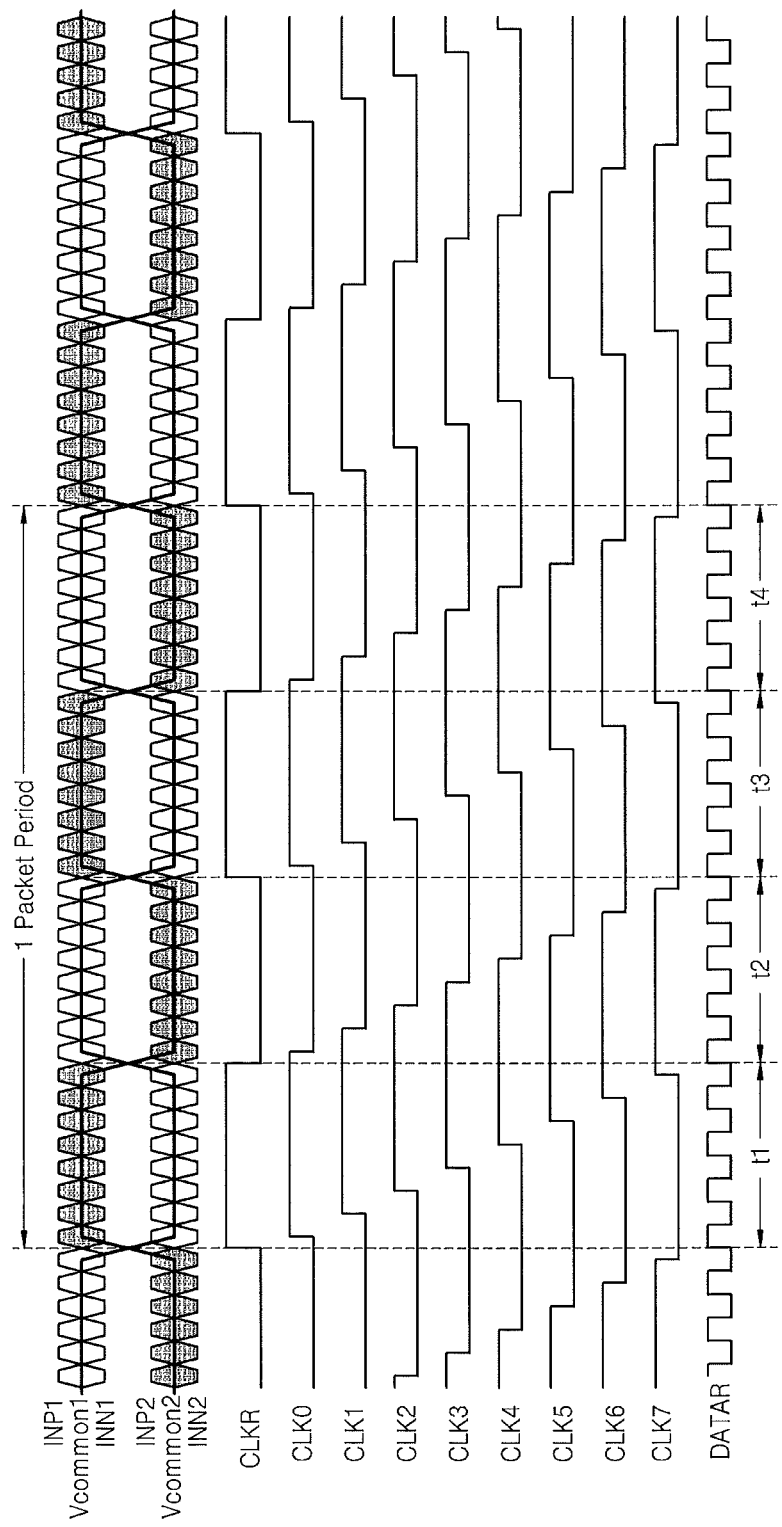
FIG. 12B is a waveform diagram of signals related to the receiver of FIG. 9 when the clock signal generator of the receiver is embodied as illustrated in FIG. 6, according to another embodiment of the inventive concept.

Referring to FIGS. 6, 8 to 10, and 12A, the receiver 820 receives a pair of first differential signals INP1 and INN1 and a pair of second differential signals INP2 and INN2 as illustrated in FIG. 12A from the transmitter 810. Voltages of the pair of first differential signals INP1 and INN1 are higher than those of the pair of second differential signals INP2 and INN2 in a first section and are lower than those of the pair of second differential signals INP2 and INN2 in a second section. A first common voltage Vcommon1 of the pair of first differential signals INP1 and INN1 is higher than a second common voltage Vcommon2 of the pair of second differential signals INP2 and INN2 in the first section and is lower than the second common voltage Vcommon2 of the pair of second differential signals INP2 and INN2 in the second section t2. However, the inventive concept is limited thereto, and the voltages of the pair of first differential signals INP1 and INN1 may be lower than those of the pair of second differential signals INP2 and INN2 in the first section and may be higher than those of the pair of second differential signals INP2 and INN2 in the second section. FIG. 12A illustrates that the length of the first section t1 is equal to that of the second section t2 but may be different from that of the second section t2. Also, FIG. 12A illustrates that one data packet is divided into the first section t1 and the second section t2 but the data packet may be divided into n sections, where n is an even number. FIG. 12B illustrates a case where one data packet is divided into first to fourth sections t1, t2, t3, and t4.

The first differential signal INP1 or INN1 is applied to the first (+) input terminal of the first comparator 920 and the second differential signal INP2 or INN2 is supplied to the second (−) input terminal of the first comparator 920. In the first section t1, the voltage of the first differential signal INP1 or INN1 is higher that of the second differential signal INP2 or INN2 and a reference clock signal CLKR is thus logic high. In the second section t2, the voltage of the first differential signal INP1 or INN1 is lower than that of the second differential signal INP2 or INN2 and the reference clock signal CLKR is thus logic low. The clock signal generator 930 of FIG. 6 that is a DLL receives the reference clock signal CLKR, delays it for a predetermined time, and then outputs a clock signal CLK. Since FIG. 12A illustrates a case where the data packet is 32 bits long and the length of the first section t1 is equal to that of the second section t2, the clock signal generator 930 generates and outputs sixteen clock signals CLK0, CLK1, . . . , and CLK15. That is, the clock signal generator 930 outputs the clock signal CLK0 by delaying the reference clock signal CLKR for the predetermined time and outputs the clock signal CLK1 by delaying the clock signal CLK0 for the predetermined time. The clock signal generator 930 outputs sequentially the clock signals CLK0, CLK1, . . . , and CLK15 that are obtained in this way. However, if the number of bits in the data packet changes, the clock signal generator 930 may generate clock signals, the total number of which is different from sixteen by adjusting the predetermined time.

The first differential signal INP1 or INN1 is supplied to the first (+) input terminal of the second comparator 950 and the other first differential signal INP1 or INN1 is supplied to the second (−) input terminal of the second comparator 950. In this case, first reference data DATAR1 output from the second comparator 950 is serial data, and the first data generator 960 may transform the first reference data DATAR1 that is serial data into first data DATA1 that is parallel data and output the first data DATA1, in response to the clock signal CLK. The first data generator 960 may generate the first data DATA1 at rising and falling edges of the clock signals CLK0, CLK1, . . . , and CLK15. That is, the first data generator 960 may generate the first data DATA1 at the rising edges of the clock signals CLK0, CLK1, . . . , and CLK15 in the first section t1, and may generate the first data DATA1 at the falling edges of the clock signals CLK0, CLK1, . . . , ad CLK15 in the second section t2.

The second differential signal INP2 or INN2 is supplied to the first (+) input terminal of the third comparator 980 and the other second differential signal INP2 or INN2 is supplied to the second (−) input terminal of the third comparator 980. In this case, second reference data DATAR2 output from the third comparator 980 may be serial data, and the second data generator 990 may transform the second reference data DATAR2 that is serial data into second data DATA2 that is parallel data and then output the second data DATA2, in response to a clock signal CLK. The second data generator 990 may generate the second data DATA2 at the rising and falling edges of the clock signals CLK0, CLK1, . . . , and CLK15. That is, the second data generator 990 may generate the second data DATA2 at the rising edges of the clock signals CLK0, CLK1, . . . , and CLK15 in the first section t1, and may generate the second data DATA2 at the falling edges of the clock signals CLK0, CLK1, . . . , and CLK15 in the second section t2.

FIG. 12B is a waveform diagram of signals related to the receiver 820 of FIG. 9 when the clock signal generator 930 of the receiver 820 is embodied as illustrated in FIG. 6, according to another embodiment of the inventive concept. That is, FIG. 12B is a waveform diagram of signals related to the receiver 820 when the clock signal generator 230 includes a DLL as illustrated in FIG. 6, according to another embodiment of the inventive concept.

FIG. 12A illustrates a case where one data packet is divided into a first section t1 and a second section t2, whereas FIG. 12B illustrates a case where one data packet is divided into first to fourth sections t1, t2, t3, and t4.

Referring to FIGS. 6, 8 to 10 and 12B, the receiver 820 receives a pair of first differential signals INP1 and INN1 and a pair of second differential signals INP2 and INN2 as illustrated in FIG. 12B from the transmitter 110. Voltages of the pair of first differential signals INP1 and INN1 are higher than those of the pair of second differential signals INP2 and INN2 in the first section t1 and the third section t3 and are lower than those of the pair of second differential signals INP2 and INN2 in the second section t2 and the fourth section t4. A first common voltage Vcommon1 of the pair of first differential signals INP1 and INN1 is higher than a second common voltage Vcommon2 of the pair of second differential signals INP2 and INN2 in the first section t1 and the third section t3, and are lower than the second common voltage Vcommon2 of the pair of second differential signals INP2 and INN2 in the second section t2 and the fourth section t4. However, the inventive concept is not limited thereto as described above with reference to FIG. 12A.

The first differential signal INP1 of INN1 is supplied to the first (+) input terminal of the first comparator 920 and the second differential signal INP2 or INN2 is supplied to the second (−) input terminal of the first comparator 920. In the first section t1 and the third section t3, the voltage of the first differential signal INP1 or INN1 is higher than that of the second differential signal INP2 or INN2 and a reference clock signal CLKR is thus logic high. In the second section t2 and the fourth section t4, the voltage of the first differential signal INP1 or INN1 is lower than that of the second differential signal INP2 or INN2 and the reference clock signal CLKR is thus logic low. The clock signal generator 930 of FIG. 6 that is a DLL receives the reference clock signal CLKR, delays it for a predetermined time, and then outputs a clock signal CLK. FIG. 12B illustrates a case where one data packet is 32 bits long and the lengths of the first to fourth sections t1, t2, t3, and t4 are equal to one another, and thus, the clock signal generator 930 generates and outputs eight clock signals CLK0, CLK1, . . . , and CLK7. That is, the clock signal generator 930 outputs a clock signal CLK0 by delaying the reference clock signal CLKR for the predetermined time and outputs a clock signal CLK1 by delaying the clock signal CLK0 for the predetermined time. The clock signal generator 930 outputs sequentially the clock signals CLK0, CLK1, . . . , and CLK7 that are generated in this way. Referring to FIG. 12B, since the data packet is divided into four sections, i.e., the first to fourth sections t1 to t4, data may be generated using the clock signals CLK0, CLK1, . . . , and CLK7, the total number of which is half that of the clock signals CLK0, CLK1, . . . , and CLK15 illustrated in FIG. 12A. That is, when the receiver 820 receives the pair of first differential signals INP1 and INN1 and the pair of second differential signals INP2 and INN2 illustrated in FIG. 12B, the total number of the delay terminals of delayer 630 may be reduced to half compared to when the receiver 820 receives the pair of differential signals INP and INN illustrated in FIG. 12A.

The operations of the first data generator 940 and the second data generator 970 are as described above with reference to FIG. 12A.

Figure 13:
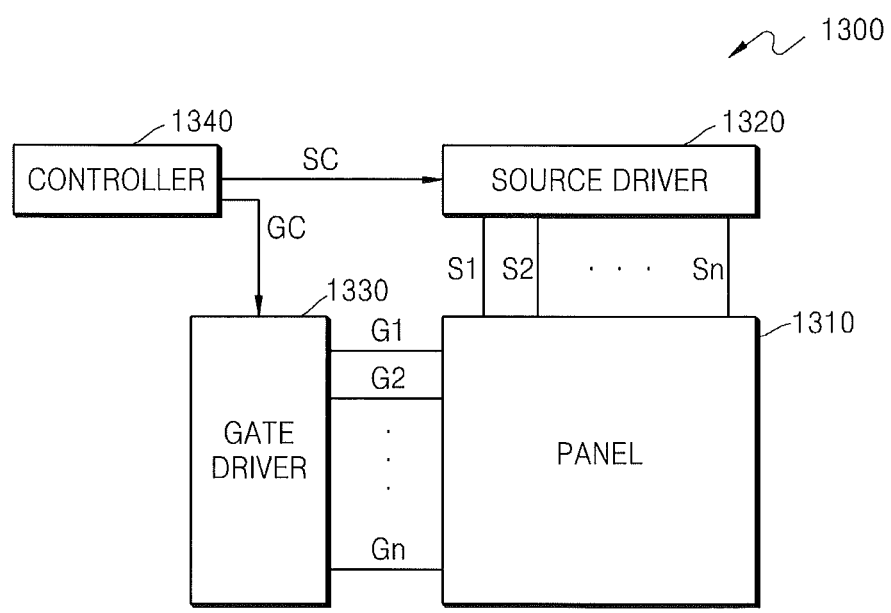
FIG. 13 is a block diagram of a display device according to an embodiment of the inventive concept.

FIG. 13 is a block diagram of a display device 1300 according to an embodiment of the inventive concept. Referring to FIG. 13, the display device 1300 may include a panel 1310, a source driver 1320, a gate driver 1330, and a controller 1340. The panel 1310 may include a plurality of pixel regions. In the panel 1310, a plurality of gate lines G1, G2, . . . to Gn and a plurality of source lines S1, S2, . . . to Sn intersect one another in a matrix, and points where the plurality of gate lines GL and the plurality of source lines SL intersect one another are defined as the plurality of pixel regions.

The controller 1340 may control the source driver 1320 and the gate driver 1330. The controller 1340 receives a plurality of control signals and a plurality of data signals from an external system (not shown). The controller 1340 generates a gate control signal GC and a source control signal SC according to the plurality of control signals and the plurality of data signals, outputs the gate control signal SC to the gate driver 1330, and then outputs the source control signal SC to the source driver 1340. According to an embodiment of the inventive concept, the controller 1340 may transmit a pair of differential signals as described above as an example of the source control signal SC to the source driver 1320. For example, the controller 1340 may operate similar to the transmitter 110 of FIG. 1 or the transmitter 810 of FIG. 8.

The gate driver 1330 supplies a plurality of gate driving signals (not shown?) sequentially to the panel 1310 via the plurality of gate lines G1, G2, . . . to Gn, respectively, in response to the gate control signal CG. The source driver 1340 supplies a predetermined gray-scale voltage to the panel 1310 via one of the plurality of source lines S1, S2, . . . to Sn whenever each of the plurality of gate lines G1, G2, . . . to Gn is selected sequentially, in response to the source control signal SC. The operation of the source driver 1340 according to an embodiment of the inventive concept will now be described in detail with reference to FIGS. 14A and 14B.

Figure 14A:
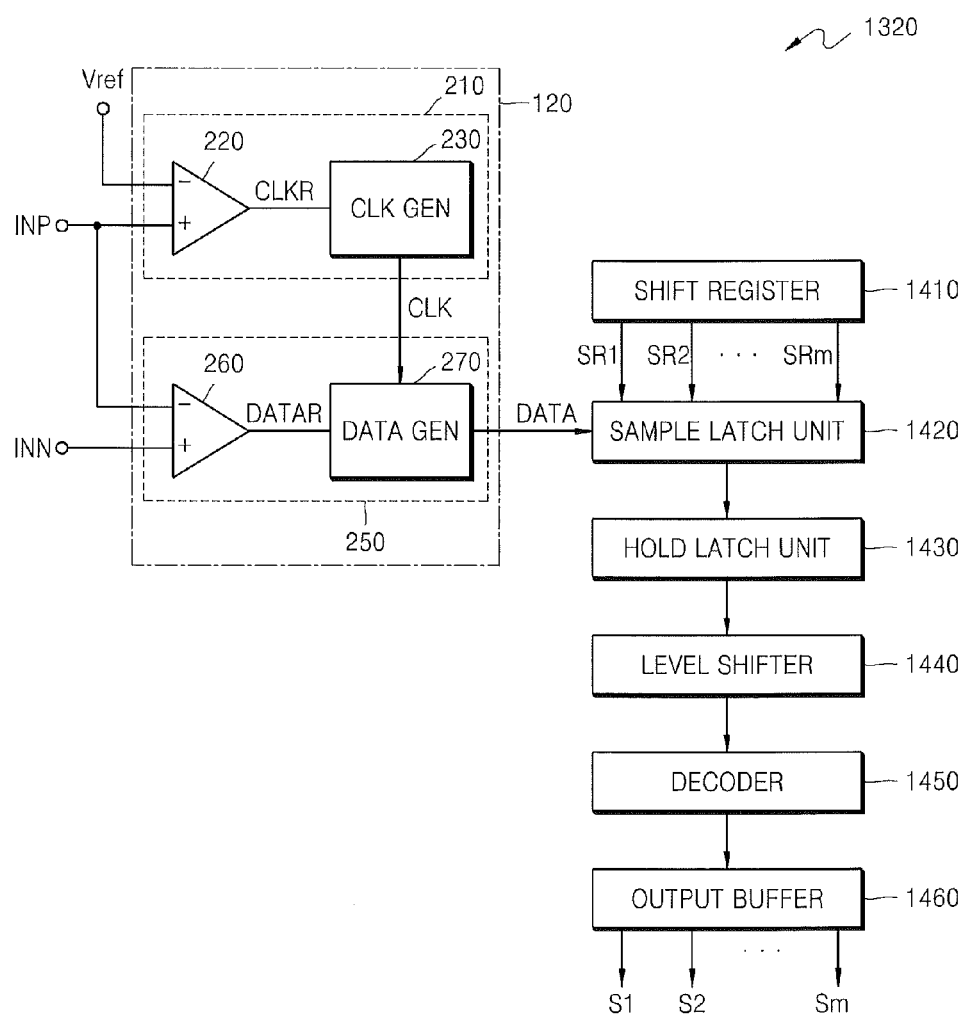
FIG. 14A is a block diagram of a source driver included in the display device of FIG. 13, according to an embodiment of the inventive concept.

FIG. 14A is a block diagram of the source driver 1320 included in the display device 1300 of FIG. 13, according to an embodiment of the inventive concept. Referring to FIGS. 2, 13, and 14A, the source driver 1320 may include a receiver 120, a shift register 1410, a sample latch unit 1420, a hold latch unit 1430, a level shifter 1440, a decoder 1450, and an output buffer 1460.

Figure 14B:
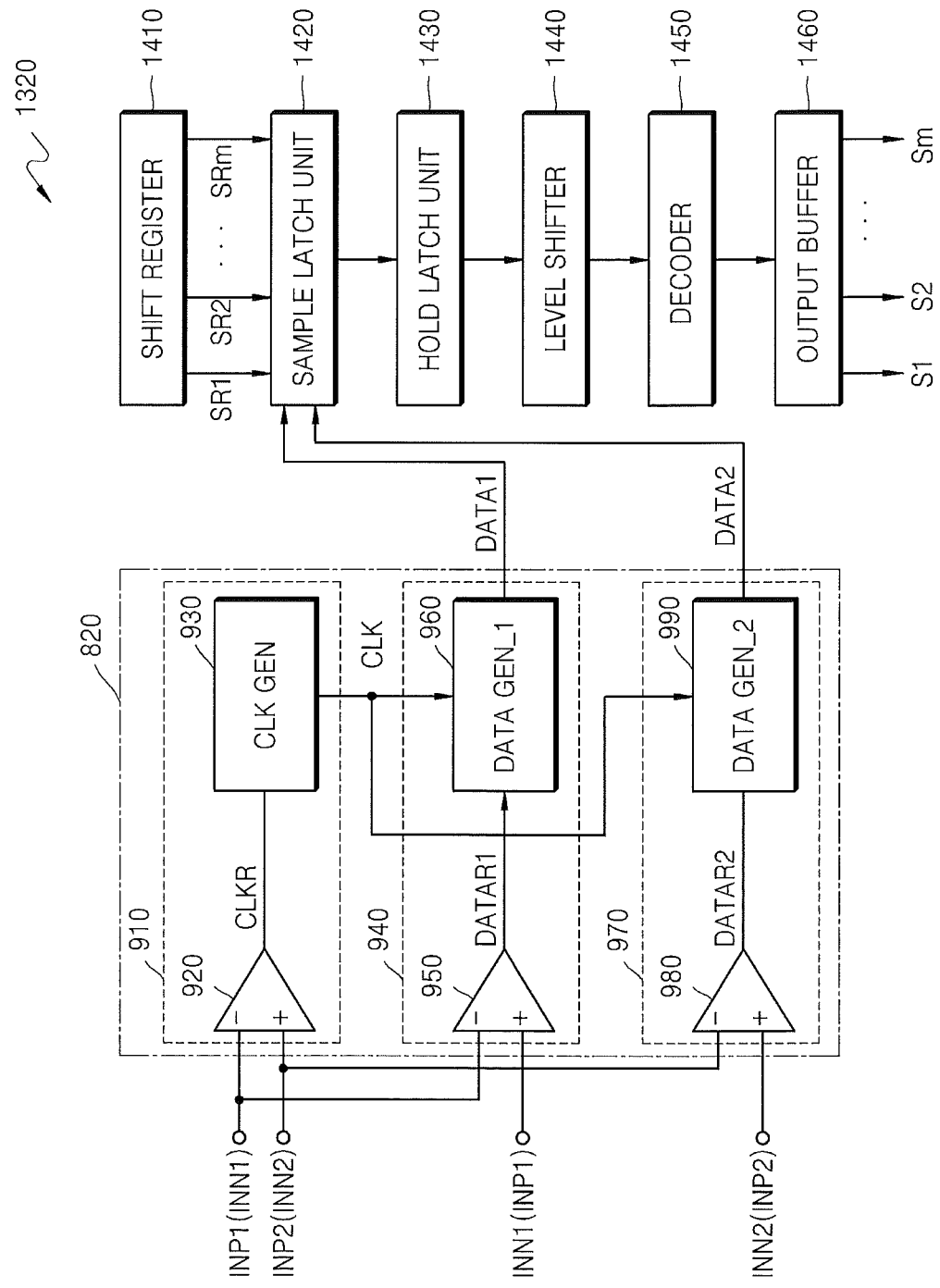
FIG. 14B is a block diagram of another embodiment of the source driver of FIG. 13, according to the inventive concept.

The structure of the receiver 120 of FIG. 14B may be similar to that of the receiver 120 of FIG. 2. That is, the receiver 120 of FIG. 14B may include a clock signal generator 210 having a first comparator 220 and a clock signal generator 230, and a data generation unit 250 having a second comparator 260 and a data generator 270. The source control signal SC of FIG. 13 may include a pair of differential signals INP and INN as illustrated in FIG. 2. That is, the source control signal SC may include the pair of differential signals INP and INN, the voltages of which are higher than a reference voltage in a first section and are lower than the reference voltage in a second section. The structure and operation of the receiver 120 are as described above with reference to FIGS. 1 to 7B.

The shift register 1410 shifts a start pulse signal received from the controller 1340. The sample latch unit 1420 samples data DATA received from the receiver 120, in response to a plurality of output signals SR1, SR2, . . . , to SRm output from the shift register 1410. The hold latch unit 1430 stores the sampled data for a horizontal scan time. The hold latch unit 1430 is driven using a low voltage and the decoder 1450 is driven using a high voltage. Thus, the level shifter 1440 transforms a voltage of the sample data stored in the hold latch unit 1430 and then outputs the transformation result to the decoder 1450. The decoder 1450 applies one of a plurality of gray-scale voltages to the output buffer 1460, based on the transformation result. The output buffer 1460 outputs the applied gray-scale voltage via one of a plurality of source lines S1, S2, . . . , to Sm.

FIG. 14B is a block diagram of another embodiment of the source driver 1320 of FIG. 13, according to the inventive concept. Referring to FIGS. 9 and 13 to 14B, the source driver 1320 may include a receiver 820, a shift register 1410, a sample latch unit 1420, a hold latch unit 1430, a level shifter 1440, a decoder 1450, and an output buffer 1460.

The receiver 820 of FIG. 14B has the same structure as the receiver 820 of FIG. 9. That is, the receiver 820 may include a clock signal generator 910 having a first comparator 920 and a clock signal generator 930, a first data generator 940 having a second comparator 950 and a first data generator 960, and a second data generator 970 having a third comparator 980 and a second data generator 990. The source control signal SC of FIG. 13 may include a pair of first differential signals INP1 and INN1 and a pair of second differential signals INP2 and INN2 as illustrated in FIG. 8. As described above, voltages of the pair of first differential signals INP1 and INN1 may be higher than those of the pair of second differential signals INP2 and INN2 in a first section and are lower than those of the pair of second differential signals INP2 and INN2 in a second section. The structure and operation of the receiver 820 are as described above with reference to FIGS. 8 to 12B.

The operations of the shift register 1410, the sample latch unit 1420, the hold latch unit 1430, the level shifter 1440, the decoder 1450, and the output buffer 1460 illustrated in FIG. 14B are similar to those of the shift register 1410, the sample latch unit 1420, the hold latch unit 1430, the level shifter 1440, the decoder 1450, and the output buffer 1460 illustrated in FIG. 14A, respectively.

Thus, as described herein, receivers according to embodiments of the invention include a data recovery circuit responsive to a pair of input signals. One example of a data recovery circuit 120 is illustrated by FIG. 2. This data recovery circuit 120 includes a clock generator circuit 210 and a data generator circuit 250. The clock generator circuit 210 is configured to generate a recovered clock signal CLK in response to comparing a first of the pair of input signals (e.g., INP) against a reference voltage (Vref). The data generator circuit 250 is responsive to the recovered clock signal CLK. The data generator circuit 250 is configured to generate a reference data stream DATAR in response to comparing the first of the pair of input signals (e.g., INP) against a second of the pair of input signals (e.g., INN). As illustrated by FIG. 2, the data generator circuit 250 is also configured to use the recovered clock signal CLK to extract a recovered data stream DATA from the reference data stream DATAR. This extraction is performed by a data generator 270, which may be of conventional design. As illustrated by FIGS. 4 and 6, a clock generator 230 within the clock generator circuit 210 may be a phase-locked loop (PLL) integrated circuit or a delay-locked loop (DLL) integrated circuit, for example. The clock generator circuit 210 may also include a first comparator 220 configured to generate a reference clock signal CLKR from the first of the pair of input signals INP and the reference voltage Vref. The data generator circuit 250 may include a second comparator 260, which is configured to generate the reference data stream DATAR from the pair of input signals INP and INN. As further illustrated by FIG. 5A, the reference voltage Vref has a fixed magnitude and the pair of input signals INP and INN encode a periodic common voltage signal (Vcommon) having a frequency equivalent to a frequency of the reference clock signal CLKR, which is generated by the first comparator 220.

A receiver 820 according to another embodiment of the invention is illustrated by FIGS. 8-9. This receiver 820 includes a data recovery circuit responsive to first and second pairs of input signals (INP1/INN1, INP2/INN2). This data recovery circuit includes a clock generator circuit 910, a first data generator circuit 940 and a second data generator circuit 970. The clock generator circuit 910 is configured to generate a recovered clock signal CLK in response to comparing a first of the first pair of input signals (e.g., INP1) relative to a first of the second pair of input signals (INP2). The first data generator circuit 940 is responsive to the recovered clock signal CLK. The first data generator circuit 940 is configured to generate a first reference data stream DATAR1 in response to comparing the first of the first pair of input signals INP1 relative to a second of the first pair of input signals INN1. The second data generator circuit 970 is responsive to the recovered clock signal CLK. The second data generator circuit 970 is configured to generate a second reference data stream DATAR2 in response to comparing the first of the second pair of input signals INP2 relative to a second of the second pair of input signals (e.g., INN2). As illustrated by FIG. 11A, the first of the first pair of input signals encodes a first common voltage signal Vcommon1 having a first frequency and the first of the second pair of input signals (e.g., INP2) encodes a second common voltage signal Vcommon2 having the first frequency. The first and second common voltage signals Vcommon1 and Vcommon2 are 180 degrees out-of-phase relative to each other.

While the inventive concept has been particularly shown and described with reference to exemplary embodiments thereof, it will be understood that various changes in form and details may be made therein without departing from the spirit and scope of the following claims.

What is claimed is:

1. A receiver, comprising:
   a data recovery circuit responsive to a pair of differential input signals, said data recovery circuit comprising:
      a clock generator circuit configured to generate a recovered clock signal in response to comparing a first of the pair of differential input signals against a reference voltage having a fixed value; and
      a data generator circuit responsive to the recovered clock signal, said data generator circuit configured to generate a reference data stream in response to comparing the first of the pair of differential input signals against a second of the pair of differential input signals;
   wherein a difference voltage of the pair of differential input signals is constant, and a common voltage of the pair of differential input signals is higher than the reference voltage in a first section of a period and is lower than the reference voltage in a second section of the period.

2. The receiver of claim 1, wherein said data generator circuit is further configured to use the recovered clock signal to extract a recovered data stream from the reference data stream.

3. The receiver of claim 1, wherein said clock generator circuit comprises a clock generator selected from a group consisting of a phase-locked loop (PLL) integrated circuit and a delay-locked loop (DLL) integrated circuit.

4. The receiver of claim 3, wherein said clock generator circuit comprises a first comparator configured to generate a reference clock signal from the first of the pair of differential input signals and the reference voltage; and wherein the clock generator is responsive to the reference clock signal.

5. The receiver of claim 4, wherein said data generator circuit comprises a second comparator configured to generate the reference data stream from the pair of differential input signals.

6. The receiver of claim 4, wherein the reference voltage has a fixed magnitude; and wherein each of the pair of input signals encode a periodic common voltage signal therein having a frequency equivalent to a frequency of the reference clock signal; and wherein the first comparator is configured to generate the reference clock signal in response to decoding the periodic common voltage signal from the first of the pair of differential input signals.

7. The receiver of claim 4, wherein a frequency of the recovered clock signal is N times a frequency of the reference clock signal, where N is an integer greater than one.

8. A receiver, comprising:
   a data recovery circuit responsive to first and second pairs of differential input signals, said data recovery circuit comprising:
      a clock generator circuit configured to generate a recovered clock signal in response to comparing a first of the first pair of differential input signals relative to a first of the second pair of differential input signals;
      a first data generator circuit responsive to the recovered clock signal, said first data generator circuit configured to generate a first reference data stream in response to comparing the first of the first pair of differential input signals relative to a second of the first pair of differential input signals; and
      a second data generator circuit responsive to the recovered clock signal, said second data generator circuit configured to generate a second reference data stream in response to comparing the first of the second pair of differential input signals relative to a second of the second pair of differential input signals;
   wherein a first common voltage of the first pair of differential input signals is higher than a second common voltage of the second pair of differential signals in a first section of a period, and is lower than the second common voltage of the pair of differential signals in a second section of the period.

9. The receiver of claim 8, wherein the first of the first pair of differential input signals encodes a first common voltage signal having a first frequency; wherein the first of the second pair of differential input signals encodes a second common voltage signal having the first frequency; and wherein the first and second common voltage signals are periodic signals that are 180 degrees out-of-phase relative to each other.

10. The receiver of claim 8, wherein a frequency of the recovered clock signal is N times the first frequency, where N is an integer greater than one.

11. A receiver comprising:
- a clock signal generator for generating a clock signal, based on the result of comparing a voltage of one of a pair of differential signals with a reference voltage; and
- a data generator generating data from the pair of differential signals, in response to the clock signal,
- wherein a difference voltage of the pair of differential signals is constant and wherein a common voltage of the pair of differential signals is higher than the reference voltage in a first section of a period and are lower than the reference voltage in a second section of the period.

12. The receiver of claim 11, wherein the clock signal generator comprises:
- a first comparator for comparing the voltage of one of the pair of differential signals with the reference voltage and outputting a reference clock signal; and
- a clock signal generator for generating the clock signal by using the reference clock signal.

13. The receiver of claim 12, wherein the clock signal generator comprises a phase locked loop or a delay locked loop.

14. The receiver of claim 11, wherein the data generator comprises:
- a second comparator for comparing one of the pair of differential signals with the other differential signal and outputting reference data; and
- a data generator for generating the data from the reference data, in response to the clock signal.

15. The receiver of claim 14, wherein the data generator transforms the reference data that is serial data into the data that is parallel data, in response to the clock signal.

16. The receiver of claim 11, wherein the data generator generates the data at rising and falling edges of the clock signal.

17. The receiver of claim 11, wherein, in the pair of differential signals, a length of the first section is the same as a length of the second section.

* * * * *